2,950,269
Patented Aug. 23, 1960

2,950,269
PROCESS FOR THE PRODUCTION OF MIXED POLYAMIDES

Walter Reppe, Heidelberg, and Heinz Pohlemann and Karl Jaeckel, Ludwigshafen (Rhine), Germany, assignors to Badische Anilin- & Soda-Fabrik Aktiengesellschaft, Ludwigshafen (Rhine), Germany No Drawing. Filed Jan. 24, 1958, Ser. No. 710,861

Claims priority, application Germany Jan. 25, 1957

8 Claims. (Cl. 260—78)

This invention relates to mixed polyamides and a process of making the same.

Processes for the production of polyamides of omega-capryllactam by themselves as well as in admixture with other polyamide-forming substances have heretofore already been known. Proposals have been made to produce mixed polyamides containing only a few percent of omega-capryllactam. Another known process consists in reacting 200 parts of omega-aminocaprylamide with 100 parts of hexamethylenediammonium sebacate and 500 parts of 7-aminoheptane carboxylic acid with 150 parts of hexamethylene diammonium adipate. It is also known to heat omega-aminocaprylonitrile with additions of water under pressure and thus to convert them into spinnable polycondensates. In this latter process the diamine contained in the omega-aminocaprylonitrile is neutralized by additions of equivalent amounts of adipic acid. Many of these prior art products either have an unsatisfactory brittleness temperature (ASTM D746/52T) or a very high modulus of elasticity (Young's modules, ASTM D638/49T), but a low water absorption capacity, or if additions of large quantities of other polyamide-forming substances are made, a low modulus of elasticity and a satisfactory brittleness temperature but a relatively high water absorption capacity.

We have now found that linear plastics with a particularly low modulus of elasticity, a water absorption capacity equal to that of pure polycapryllactam and a satisfactory brittleness temperature, which can be spun, and worked into sheets, tapes, and threads, can be obtained by making a mixed polyamide of (A) omega-capryllactac, (B) a salt-forming mixture of (a) a dicarboxylic acid with more than five carbon atoms (b) a diamine with more than five carbon atoms, and (C) a salt-forming mixture of (a) a dicarboxylic acid with more than five carbon atoms, and (c) 4.4'-diamino-dicyclohexylmethane, in such a way that omega-capryllactam (A) is polymerized and condensed with 5 to 20, preferably 10 to 20, percent by weight of the components (B) plus (C).

Instead of the salt-forming mixtures the salts of the above-mentioned dicarboxylic acids and diamines can be used just as well. Suitable dicarboxylic acids, especially saturated aliphatic dicarboxylic acids, with more than five carbon atoms are for instance adipic acid, pimelic acid, suberic acid, acelaic acid, sebacic acid, nonanedicarboxylic acid, undekanedicarboxylic acid, tridekanedicarboxylic acid, or heptadekanedicarboxylic acid. In addition to the aforesaid substances of the aliphatic type dicarboxylic acids of the cycloaliphatic and aromatic types may also be used. Terephthalic acid for example can be used with good success. Other phthalic acids, especially isophthalic acid, furthermore tetrahydrophthalic acids and hexahydrophthalic acids, can also be employed. Suitable diamines with more than five carbon atoms are above all saturated aliphatic diamines with more than five carbon atoms, such as hexamethylene diamine, heptamethylene diamine, octamethylene diamine, dekamethylene diamine, tetradekamethylene diamine, and nonadekamethylene diamine (octylundekanediamine). The ratio of mixing preferred in the practice of our invention is 20 to 5 parts by weight of the mixture of the components (B) and (C) to every 80 to 95 parts of omega-capryllactam or, preferably, 20 to 10 parts of (B) plus (C) to 80 to 90 parts of omega-capryllactam. In the mixture (B) plus (C) either component may make up about 20 to 80%, B being preferably used in excess. The best ratio is about 50 to 80 parts of (B) to 50 to 20 parts of (C).

The polymerization of polycondensation process is carried out at the temperatures usually applied in polyamide production, preferably at 240° to 300° C. The process can be carried out at normal or increased pressure, e.g. up to about 25 atmospheres, as well as at reduced pressures, e.g. down to 5 mm. It is advantageous to work away from atmospheric oxygen and to carry out the reaction in the presence of an inert gas, e.g. nitrogen, carbon dioxide, or a noble gas, such as helium.

Our invention will be illustrated in greater detail in the following examples. The parts specified in the examples are parts by weight.

Example 1

255 parts of omega-capryllactam, 30 parts of sebacic acid salt of 1.8-octamethylene diamine, 7.35 parts of sebacic acid and 7.65 parts of 4.4'-diamino-dicyclohexylmethylene are heated for 8 hours to 270 to 280° C. in a condensation vessel of stainless steel (AISI 321), in which air has been displaced by oxygen-free nitrogen, while continuously allowing nitrogen to bubble through. After cooling there 7 parts of water are distilled off. After cooling there is obtained a colorless polyamide with a K-value of 79.0 (according to Fikentscher, page 58, 13th volume of Cellulosechemic (1932)), a brittleness temperature of −65° to −70° C., a modulus of elasticity of 11,000 kg./cm.$^2$, and a softening point of 185° to 190° C.

Example 2

510 parts of omega-capryllactam, 60 parts of the suberic acid salt of 1.8 octamethylene diamine, 13.5 parts of suberic acid, and 16.5 parts of 4.4'-diaminodicyclohexylmethane are heated for 7 to 8 hours to 270 to 280° C. away from oxygen.

10 parts of water are set free. After cooling with exclusion of oxygen there is obtained a colorless polyamide with the melting point 181° to 185° C., which can be spun into easily extensible, solid threads or tapes. It has a K-value of 79.5, a brittleness temperature of −55° to −60° C. and a modulus of elasticity of 9,300 kg./cm.$^2$ with only a small content of monomer.

Example 3

In a closed condensation vessel which is filled with pure nitrogen 255 parts of omega-capryllactam, 30 parts of the suberic acid salt of 1.8 octamethylene diamine, 8.25 parts of 4.4'-diaminodicyclohexylmethane, and 6.75 parts of suberic acid are heated for two hours to 270° to 280° C. The inner pressure rises to 10 to 15 atmospheres. The pressure is then released and the mixture again heated for 7 hours to 270° to 280° in pure nitrogen. After cooling there is obtained a polyamide with the same brittleness temperature as the product described in Example 2, and a K-value of 84.0 to 85.0, which lends itself admirably to working into sheets both on a screw extruder by extrusion through wide flat dies and by the blowing method. The modulus of elasticity is 6,500 to 7,000 kg./cm.$^2$.

Example 4

In a condensation vessel of stainless steel (AISI 321) 255 parts of omega-capryllactam, 30 parts of the adipic acid salt of 1.8 octamethylene diamine, 6.15 parts of adipic acid, and 8.85 parts of 4.4'-diaminodicyclohexylmethane are heated in pure nitrogen for 9 hours to 270° to 280° C. while distilling off the water that develops in the process. The colorless melt is then allowed to cool. The polyamide thus obtained has a K-value of 66.5, a softening point of 182° to 185° C. and a brittleness temperature of −35° to −38° C.

*Example 5*

510 parts of omega-capryllactam, 60 parts of the terephthalic acid salt of 1.8 octamethylene diamine, 6.6 parts of terephthalic acid, and 8.4 parts of 4.4′-diaminodicyclohexylmethane are reacted as described in Example 4.

The polyamide which is thereby obtained has a K-value of 78.5, a softening point of 186° to 190° C., and a brittleness temperature of −50° to −53° C.

What we claim is:

1. A process for the production of fiber-forming mixed polyamides which comprises mixing (A) omega-capryllactam, (B) a salt-forming mixture of (*a*) a dicarboxylic acid with more than 5 carbon atoms in which acid the carboxylic groups are attached to different carbon atoms which are separated from one another by carbon atoms, and (*b*) a saturated aliphatic diamine with more than 5 carbon atoms in which diamine the amino groups are attached to different carbon atoms which are separated from one another by carbon atoms, and (C) a salt-forming mixture of (*a′*) a dicarboxylic acid with more than 5 carbon atoms in which acid the carboxylic groups are attached to different carbon atoms which are separated from one another by carbon atoms, and (*b′*) 4.4′-diaminodicyclohexylmethane at a ratio of from 95 to 80% by weight of (A) and of from 5 to 20% by weight of a mixture of the components (B) and (C), the proportion of (B) and (C) being from 20:80 to 80:20 by weight and subjecting the mixture thus obtained to polymerization by heating to polymerization temperatures from about 240° to 300° C.

2. The process as claimed in claim 1 wherein 80 to 90% by weight of omega-capryllactam and 20 to 10% by weight of the mixture of the components (B) and (C) are used.

3. The process as claimed in claim 1 wherein the components (B) and (C) are composed of preformed salts.

4. The process as claimed in claim 1 wherein 50 to 80 parts by weight of (B) are used per every 50 to 20 parts by weight of (C).

5. A fiber-forming polyamide of 80 to 95% by weight of (A) omega-capryllactam and 20 to 5% by weight of a mixture of (B) a salt-forming mixture of (*a*) a dicarboxylic acid with more than 5 carbon atoms in which acid the carboxylic groups are attached to different carbon atoms which are separated from one another by carbon atoms, and (*b*) a saturated aliphatic diamine with more than 5 carbon atoms in which diamine the amino groups are attached to different carbon atoms which are separated from one another by carbon atoms, and (C) a salt-forming mixture of (*a′*) a dicarboxylic acid with more than 5 carbon atoms in which acid the carboxylic groups are attached to different carbon atoms which are separated from one another by carbon atoms, and (*b′*) 4.4′-diaminodicyclohexylmethane, the proportion by weight of (B) to (C) being 50 to 80 to 50 to 20.

6. A fiber-forming polyamide of (A) omega-capryllactam, (B) a salt-forming mixture of (*a*) a dicarboxylic acid with more than 5 carbon atoms in which acid the carboxylic groups are attached to different carbon atoms which are separated from one another by carbon atoms, and (*b*) a saturated aliphatic diamine with more than 5 carbon atoms in which diamine the amino groups are attached to different carbon atoms which are separated from one another by carbon atoms, and (C) a salt-forming mixture of (*a′*) a dicarboxylic acid with more than 5 carbon atoms in which acid the carboxylic groups are attached to different carbon atoms which are separated from one another by carbon atoms, and (*b′*) 4.4′-diaminodicyclohexylmethane, the ratio of the components (A) and (B) plus (C) being 80 to 90% of (A) and 20 to 10% of (B) plus (C), the proportion of (B) and (C) being from 20:80 to 80:20 by weight.

7. A self-supporting sheet of a polyamide of (A) omega-capryllactam, (B) a salt-forming mixture of (*a*) a dicarboxylic acid with more than 5 carbon atoms in which acid the carboxylic groups are attached to different carbon atoms which are separated from one another by carbon atoms, and (*b*) a saturated aliphatic diamine with more than 5 carbon atoms in which diamine the amino groups are attached to different carbon atoms which are separated from one another by carbon atoms, and (C) a salt-forming mixture of (*a′*) a dicarboxylic acid with more than 5 carbon atoms in which acid the carboxylic groups are attached to different carbon atoms which are separated from one another by carbon atoms, and (*b′*) 4.4′-diaminodicyclohexylmethane, the ratio of the components (A) and (B) plus (C) being 80 to 95% of (A) and 20 to 5% of (B) plus (C), the proportion of (B) and (C) being from 20:80 to 80:20 by weight.

8. A filament of a polyamide of (A) omega-capryllactam, (B) a salt-forming mixture of (*a*) a dicarboxylic acid with more than 5 carbon atoms in which acid the carboxylic groups are attached to different carbon atoms which are separated from one another by carbon atoms, and (*b*) a saturated aliphatic diamine with more than 5 carbon atoms in which diamine the amino groups are attached to different carbon atoms which are separated from one another by carbon atoms, and (C) a salt-forming mixture of (*a′*) a dicarboxylic acid with more than 5 carbon atoms in which acid the carboxylic groups are attached to different carbon atoms which are separated from one another by carbon atoms, and (*b′*) 4.4′-diaminodicyclohexylmethane, the ratio of the components (A) and (B) plus (C) being 80 to 95% of (A) and 20 to 5% of (B) plus (C), the proportion of (B) and (C) being from 20:80 to 80:20 by weight.

References Cited in the file of this patent

FOREIGN PATENTS 67,203    Norway ---------------- Dec. 20, 1943

UNITED STATES PATENT OFFICE
CERTIFICATE OF CORRECTION

Patent No. 2,950,269                        August 23, 1960

Walter Reppe et al.

It is hereby certified that error appears in the printed specification of the above numbered patent requiring correction and that the said Letters Patent should read as corrected below.

Column 1, line 46, for "lactac" read -- lactam --.

Signed and sealed this 4th day of April 1961.

(SEAL)
Attest:    ERNEST W. SWIDER

KARL H. AXLINE
Attesting Officer

ARTHUR W. CROCKER
Acting Commissioner of Patents